United States Patent [19]

Charbonnier et al.

[11] Patent Number: 5,517,490
[45] Date of Patent: May 14, 1996

[54] TELECOMMUNICATION TERMINAL OPERATING AT ALTERNATIVE DATA THROUGHPUT RATES

[75] Inventors: Philippe Charbonnier, Le Mesnil le Roi; Pierre Deliveyne, Vaureal; Louis B. Omgba, Jouy le Moutier, all of France

[73] Assignee: Societe d'Applications Generales d'Electricite et de Mecanique Sagem, France

[21] Appl. No.: 244,504

[22] PCT Filed: Nov. 26, 1992

[86] PCT No.: PCT/FR92/01103

§ 371 Date: Oct. 13, 1994

§ 102(e) Date: Oct. 13, 1994

[87] PCT Pub. No.: WO93/11628

PCT Pub. Date: Jun. 10, 1993

[30] Foreign Application Priority Data

Nov. 27, 1991 [FR] France ................... 91 14646

[51] Int. Cl.⁶ ..................................................... H04L 7/04
[52] U.S. Cl. ..................... 370/17; 370/84; 379/94; 379/100; 358/406; 358/442
[58] Field of Search ........................ 370/17, 79, 84; 379/90, 93, 94, 96, 100; 358/406, 407, 442

[56] References Cited

U.S. PATENT DOCUMENTS

| | | | |
|---|---|---|---|
| 4,538,286 | 8/1985 | McNesby et al. | 375/112 |
| 5,041,918 | 8/1991 | Ishida et al. | 358/442 |
| 5,046,189 | 9/1991 | Kainuma | 379/100 |
| 5,050,005 | 9/1991 | Kagami | 379/100 X |
| 5,233,627 | 8/1993 | Kozima et al. | 379/100 X |

FOREIGN PATENT DOCUMENTS

| | | | |
|---|---|---|---|
| 0381515 | 6/1990 | European Pat. Off. | H04J 3/16 |
| 0461859 | 12/1991 | European Pat. Off. | H04N 1/32 |
| 1252048 | 10/1989 | Japan | H04L 13/08 |

OTHER PUBLICATIONS

Patents Abstract of Japan, vol. 14, No. 496.
Patents Abstract of Japan, vol. 14, No. 5.
Patents Abstract of Japan, vol. 15, No. 200.
Patents Abstract of Japan. vol. 6, No. 91.

*Primary Examiner*—Douglas W. Olms
*Assistant Examiner*—Russell W. Blum
*Attorney, Agent, or Firm*—Graham & James

[57] ABSTRACT

A switchable data rate ISDN terminal for group $G_4$ facsimile operation is disclosed. A decoder in the terminal automatically responds to a hexadecimal 7F formed by an extra bit added to the HDLC communications-starting flag when a 64 kb/s system transmits a 56 kb/s communication. The decoder responds by causing a speed controller in the terminal to reduce the effective data transfer rate.

10 Claims, 1 Drawing Sheet

TELECOMMUNICATION TERMINAL OPERATING AT ALTERMATIVE DATA THROUGHPUT RATES

BACKGROUND OF THE INVENTION

1. Field of the Invention

The present invention is related to telecommunications network interconnection. More particularly, the present invention is related to ISDN-type networks.

2. Discussion of Related Art

Facsimile transmission of group $G_4$, defined by CCITT Recommendation T 563, is effected by digital data transmission networks which are essentially of the integrated services digital network type (ISDN).

In France, ordinary access to the ISDN circuit, known as NUMERIS, is effected at a data transfer rate of 64,000 bits/sec (64 kilobits/sec).

In the United States, to take another example, access is effected at 56 kilobits/sec. At the interface of the French and American ISDN networks, the network of the transmitter effects a transfer rate conversion in accordance with CCITT Recommendation V110, namely:

from the United States towards France, one bit, set at 1, is added (padded) for every 7 bits;

from France towards the United States, one bit out of 8 is removed.

The stream of bits is structured in frames in accordance with Recommendation V110 and the eighth bits, to be added or subtracted depending on the direction, are located at well-determined places within frames. In the case of a communication from France towards the United States, since the French network at the interconnection removes one bit out of 8, the French transmitting facsimile machine is so established that this subtracted bit is a useless bit and therefore in order to add a useless bit, set at 1, every 7 bits transmitted and therefore to reduce the effective transfer rate from 64 kb/sec to 56 kg/sec. In the opposite direction, from the United States towards France, the French receiving facsimile machine is adapted to eliminate one bit out of 8 bits received.

In the case of a strictly French communication, the facsimile machines obviously employ the total transfer rate of 64 kb/s.

In order to cause a facsimile machine to operate at full or reduced effective transfer rate, the user at present operates a two-position switch, one national (64 kb/s) and the other international (56 kb/s).

This method is unsatisfactory. First of all, the user either does not know, or does not wish to know, the nationalities of his correspondents and the technical characteristics to be associated with them. Secondly, and even if automatic processing of the outgoing calls were effected by the facsimile machine as the result of analysis of the country codes of the telephone numbers, this processing would not be infallible in view of the fact that a national network may develop or possess several data transfer rates. Thirdly, even if one wished to provide an automatic processing of the incoming calls, a call signal would be required which supplies the numbers of the calling parties, which is still not uniformly the case.

In the course of considering the effective transfer rate, of a $G_4$ facsimile machine connected to an ISDN network, the applicant has addressed the more general problem of the operation of any facsimile terminal connected to an ISDN network. As will be seen below, the scope of the solution extends even beyond this application.

The problem having been raised, it is in fact by realizing that every $G_4$ facsimile communication commences, in accordance with Recommendation T 563, by the exchange in the two directions of contiguous HDLC flags that the applicant has been able to devise the solution provided by the present invention.

Incidentally, after this exchange of flags and before the data frames, the calling party issues an SABM (set asynchronous balanced mode) frame which the party called acknowledges by a UA (unnumbered acknowledge).

An HDLC (high rate data link control) flag is a sequence, identical from one network to the other, of six 1's surrounded by 0's (01111110). In the hexadecimal system, a HDLC flag can be written 0111 1110, namely 7 E. The HDLC standard prevents the appearance of more than five consecutive 1's in the ordinary data, that is to say, in the data frames. For this purpose, a 0 is intentionally inserted after every sequence of five 1's.

If the flags come from a 64 kb/s network they are received, with an identical form, on a national reception terminal (French) which is also connected to a 64 kb/s network. If they come from a 56 kb/s network, they undergo modification at the interconnection of the two networks.

Let us consider, for instance, an initial stream at 56 kb/s:

... 1110011111100111111 ...

At the interconnection, a $\underline{1}$ bit is added every 7 bits and the stream received at 64 kb/s has the following form:

... 1110$\underline{1}$01111111$\underline{1}$001111

In short, the flags received are no longer standardized: Regardless of the relationship between the framing of each communications starting flag and the inserted eighth bit "$\underline{1}$", there appears rapidly, at the end of one or two flags, the hexadecimal sequence 7 F, which exists only in flags that are coming from a 56 kb/s network and received on a 64 kb/s network.

Having, by way of exception, substantially explained the the effect produced by the invention, it is now easy to formulate it.

SUMMARY OF THE INVENTION

The present invention concerns a telecommunication terminal connected to an ISDN line having a transfer rate of 64 kb/s adapted to operate at a first full effective data transfer rate of 64 kb/s and at a second reduced effective data transfer rate of 56 kb/s and having an effective rate control means and transmission means and reception means for flags of HDLC type at the start of the communication, characterized by the fact that the HDLC flag reception means includes recognition means responsive to non-standard HDLC flags for determining the effective transfer rate provided by the control means.

By means of the invention, the operation of the terminal, in the mode suitable for each incoming or outgoing call, is controlled automatically, the user being thus freed of this task.

In the preferred embodiment of the terminal of the invention, said recognition means is adapted to detect the presence of an additional bit set at 1 in the communication starting flags received.

The terminal of the invention is advantageously a facsimile machine of group $G_4$.

In this connection, it should be emphasized here again that the present invention applies not only to a $G_4$ facsimile machine but also to any telecommunication terminal connected to an ISDN line and applying the stack protocols of CCITT Recommendation T 90, to which, furthermore, Recommendation T 563 refers, such as a videotex terminal, teletex terminal, etc.

It will also be emphasized that recognition of the additional bits set at 1 in the sequence of communication-starting HDLC flags in order to adapt the effective transfer rate of the terminal is a robust means, in the sense that errors can be tolerated without the recognition being affected thereby: a bit set at 1 can, in fact, be inserted once between two 0's, but the sequence 7 F will necessarily rapidly follow thereafter.

Furthermore, the recognition means of the terminal of the invention can be adapted to detect the presence of an additional bit set at 1 in various of flags, for instance flags with a single 0 bit which are encountered at times.

Further advantageously, the flag recognition means comprise a shift register which receives the series data received by the terminal, and a decoder with logical gate and memory provided by a flip-flop bistable device and the effective transfer rate control means comprise a shift register and a clock modification block and a bit padding block which blocks are controlled by the register of the control means in order to modify the data and the clock on the fly.

Preferably, in the full transfer rate state the transfer rate control means are transparent and in the reduced transfer rate state the transfer rate control means are adapted to eliminate one clock bit out of eight.

BRIEF DESCRIPTION OF THE DRAWING

The invention will be better understood on the basis of the following description of the preferred embodiment of the terminal of the invention, in the present case a $G_4$ facsimile machine, with reference to the sole FIGURE of the drawing which is in the form of a block diagram.

DETAILED DESCRIPTION OF A PREFERRED EMBODIMENT

Figure 1:
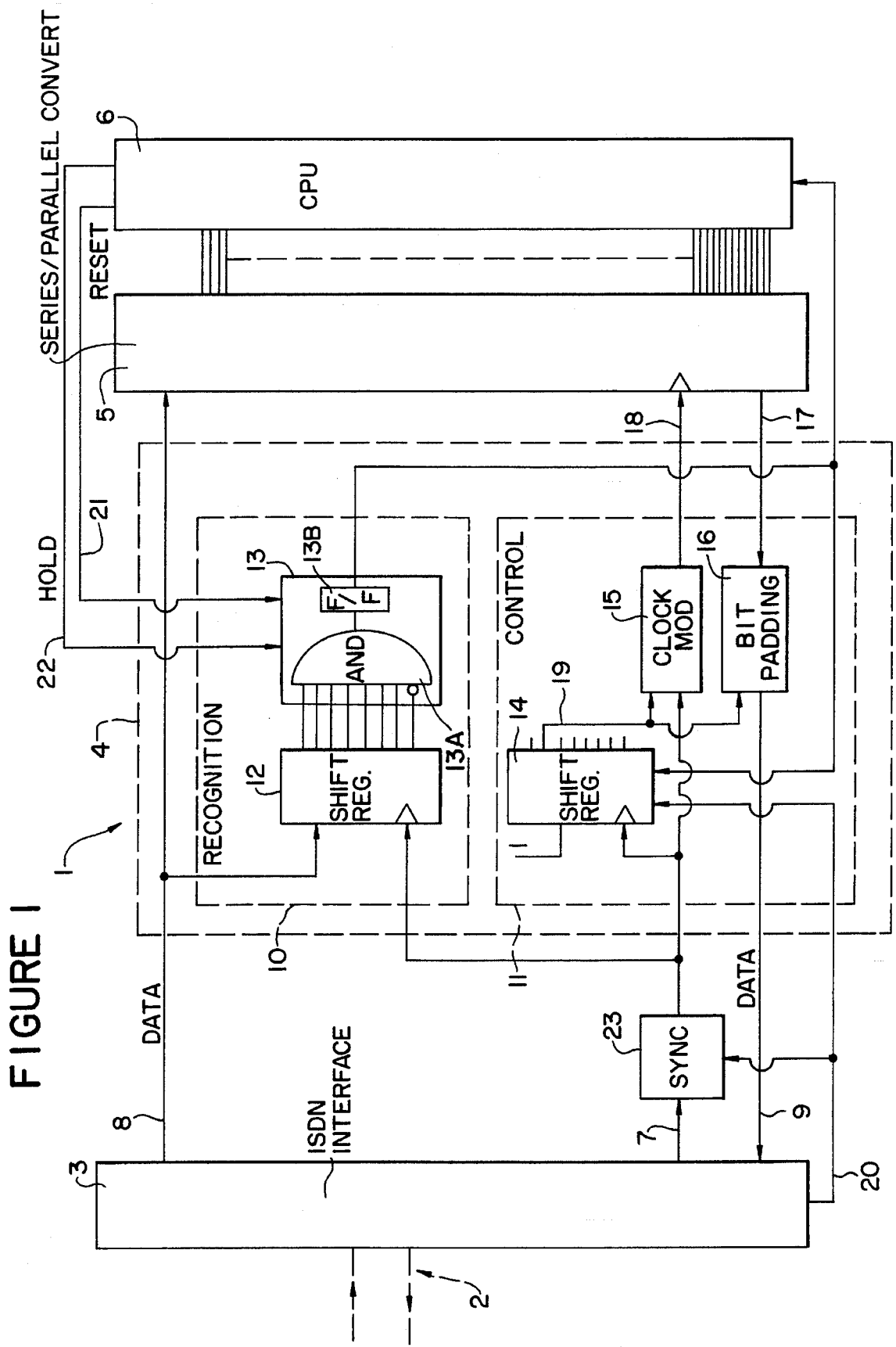

The description which follows is therefore the description of a facsimile machine 1 of group $G_4$ connected to the French ISDN network NUMERIS 2 having a transfer rate of 64 kb/s. There will be described only those parts and circuits of the facsimile machine 1 which are necessary for an understanding of the invention, the others, such as for instance the reading and printing members, being well known to those skilled in the art.

The facsimile machine 1 comprises an interface circuit 3 with the network 2, an automaton 4, a series-parallel converter 5, and a central processor unit 6.

The interface 3, in this case Part PEB 2085 of the Siemens Company, processes the ISDN frames, transmits over a line 7 the clock signal 7 received and over a line 8 the series data signal received and receives, on a line 9, the series data of the converter 5 to be transmitted before coding them. In particular, at each clock tick, the interface 3 delivers on the line 8 a data bit received from the network 2 and takes up, from the line 9, a data bit to be sent to the network 2.

The automaton 4 comprises an analysis module 10 to recognize standardized and non-standardized HDLC flags and a processing module 11 to control the effective transfer rate of the facsimile machine, controlled by the analysis module 10. The analysis module 10 comprises a shift register 12 and a memory decoder 13.

The shift register 12 receives, on its data input, the series data from the line 8 and, on its clock input, the clock bits of the line 7.

The shift register 12 has eight outputs corresponding to the eight bits of the HDLC flags, connected to eight inputs of the decoder 13.

The decoder 13 comprises an AND logical gate 13A with seven direct inputs and one inverse input, followed by a flip-flop 13B.

When a hexadecimal sequence 7 F occurs, the output of the AND gate is at level 1, which causes the flip-flop to change into the active state. The state of the flip-flop controls the effective transfer rate of the facsimile machine.

The active corresponds to a transfer rate of 56 kb/s (7 F sequence detected); the inactive state of the flip-flop corresponds to a transfer rate of 64 kb/s (absence of 7 F sequence).

The central processor 6 manages the protocols and applications of the $G_4$ facsimile machine.

The processing module 11 comprises a shift register 14, a clock modification block 15 and a padding block 16. The padding block 16 is connected, at the input, to the series output of the converter 5 by a line 17 and, at the output, to the line 9. The block 15 is connected at the input to the line 7 and at the output to the clock input of the converter 5 by a line 18. The shift register 14 receives the clock signal from the line 7 and is connected at its output to inputs of the blocks 15, 16 by a line 19. The processing module 11 is defined to modify the data and the clock on the fly.

In the 64 kb/s state of the decoder 13, the processing module 11 is transparent. By the converter 5 the central processor 6 receives directly, without modification, from the interface 3, the clock bits over the line 7-15-18 and the data bits over the line 8; it transmits, still via the converter 5, directly to the interface 3 the data bits to be transmitted over the line 17-16-9.

The output of the decoder 13 is connected to the shift register 14 of the processing module 11 in order to activate it in 56 kb/s state, and also for all practical purposes to the processor 6 for, for instance, the posting of the existing mode.

In the 56 kb/s state of the decoder 13, the register 14, controlled by the clock signal of the line 7 and activated by the decoder 13, delivers one bit every eight clock bits. The register 14, over the line 19, controls the clock modification block 15 in order to eliminate one clock bit of eight at the clock input (18) of the converter 5.

On the reception path 8-5, the data bit corresponding to the clock bit eliminated, which is useless since added previously by the network, is not taken into account by the converter 5.

On the transmission path 17-16-9, the data bit corresponding to the clock bit eliminated is not extracted from the converter 5 and, in its place, the padding block 16, controlled via the line 19 by the register 14, delivers at the interface 3, over the line 9, a bit set at 1 which will then be eliminated by the network.

The paddings and eliminations of bits effected by the processing module 11 are correctly shifted due to a synchronization of octets which is supplied by the interface 3 on a line 20 connecting the interface 3 and the register 14 of the processing module 11 and an intermediate clock synchronization block 23.

More precisely, the register 14 propagates a 1 up to its seventh output in seven clock ticks. The level 1 on the seventh output validates, at the eighth clock tick, the clock modification circuits of the block 15 and the padding circuits of the block 16. The synchronization of octets which is supplied on the line 20 the resets the register 14 to zero and the cycle starts all over again.

At the start of communication, the facsimile machine 1 is in the 64 kb/s state. It passes into the 56 kb/s state under the action of the analysis module 10, which recognizes a 7 F sequence and remains there until the end of the communication before swinging back into the 64 kb/s state by means of a line 21 connecting the processor 6 to the decoder 13. The central processor 6 can possibly hold the automaton 4 in one or the other of the two states by a second line 22 connecting it to the decoder 13 as soon as it has received coherent data confirming to it that it is actually in the proper state, for instance as a result of a successful exchange of the SABM and UA frames.

We claim:

1. A telecommunications terminal connected to an ISDN-type network, said terminal having a full effective data bit transfer rate and a reduced effective data bit transfer rate, said terminal comprising:

a speed controller, said speed controller providing an effective data bit transfer rate for transmitting and receiving messages; and recognition means, said recognition means being responsive to a non-standard communications starting flag received by the terminal to cause said speed controller to provide the reduced effective data transfer rate.

2. A terminal according to claim 1, in which said recognition means are adapted to recognize the presence of an additional bit set at 1 in the communication starting flags received.

3. A terminal according to claim 1, which is a facsimile machine of group $G_4$.

4. A terminal according to claim 1, wherein said recognition means includes:

a shift register connected to receive series data received by the terminal, said shift register having parallel outputs, and a decoder having a logical gate, said gate having at least one input connected to a respective one of said parallel outputs and a bistable device connected to said logical gate so as to be controlled by said gate.

5. A terminal according to claim 1, in which the useful transfer rate control means (11) comprise a shift register (14) and a clock modification block (15) and a bit padding block (16) which are controlled by the register (14) of the control means (11) in order to modify the data and the clock on the fly.

6. A terminal according to claim 1 wherein said recognition means includes:

a register connected to said recognition means so that the contents of said register change in response to said recognition means;

a clock connected to determine the data rate of the terminal;

a clock controller connected to said clock and to said register so as to modify the data rate determined by said clock in response to said recognition means; and a data padding controller connected to said register so as to add padding bits to said data in response to said register, whereby the data and the clock can be modified on the fly.

7. A terminal according to claim 1, in which the speed controller is adapted to eliminate one clock bit out of eight in the reduced transfer rate state.

8. The terminal according to claim 1, wherein said speed controller is only active when providing a reduced rate, so that the speed controller is transparent to said transmitting and receiving when the terminal operates at the full transfer rate.

9. The terminal according to claim 6, wherein said clock controller and said data padding controller are each connected between:

i) a processor, through a series-parallel converter; and ii) an interface to said ISDN network, whereby the data and the clock can be modified on the fly.

10. The terminal according to claim 4, wherein the decoder is connected to the shift register of the speed controller.

* * * * *